April 14, 1925. 1,533,566
S. A. NANTES
AUTOMOBILE TIRE
Filed June 25, 1924
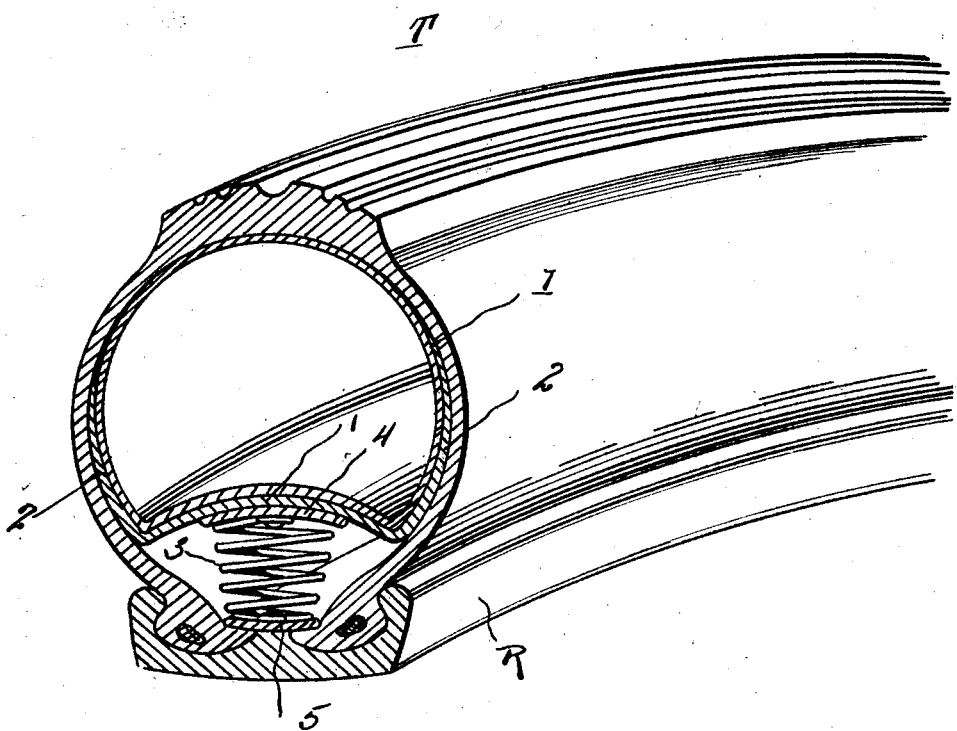
S. A. Nantes,
Inventor
By Clarence A. O'Brien
Attorney Patented Apr. 14, 1925.

1,533,566

UNITED STATES PATENT OFFICE.

SOFRONIO A. NANTES, OF CHICAGO, ILLINOIS.

AUTOMOBILE TIRE.

Application filed June 25, 1924. Serial No. 722,311.

*To all whom it may concern:*

Be it known that I, SOFRONIO A. NANTES, a citizen of the United States, residing at Chicago, in the county of Cook and State of Illinois, have invented certain new and useful Improvements in an Automobile Tire, of which the following is a specification.

This invention relates to an improved automobile tire, but it has more specific reference to a spring cushion device which is adapted to be used in conjunction with conventional tires.

It is my principal aim to generally improve upon device of this class by providing one of comparative simplicity which is such in construction as to render it exceedingly practical and to add to the elasticity and life of the tire.

More specifically speaking, I propose to interpose a spring pressed follower between the tube and the rim for assisting in absorbing the shocks to which the inner tube is subjected.

Other features and advantages of the invention will become apparent from the following description and drawings.

In the accompanying drawing forming a part of this specification and in which like numerals are employed to designate like parts throughout the same:

The figure represents a perspective of a section of an automobile tire constructed in accordance with the present invention.

Referring now to the drawing in detail, it will be seen that the tire is designated generally by the reference character T, the rim by the reference character R, and the inner tube is referred by the letter I. These parts are conventional.

The invention itself comprises, as before stated, a spring support or follower for the inner tube. While this support may be of some other construction, it preferably comprises a circumferentially extending split flexible member 1 composed of material which is sufficiently rigid to hold the shape shown. The inner or intermediate portion of the member 1 is arched and thus imparts a similar shape to the inflated tube. The side walls 2 are shaped to conform to the corresponding portion of the walls of the casing, these side walls being interposed between the casing and tube in the manner shown. Disposed at circumferentially spaced points are a plurality of coiled springs 3, which serve as yieldable supports for the so called follower member. These springs are connected at their opposite ends to washers 4 and 5 interposed between the follower and the rim respectively. The washers may be secured in place in any suitable fashion.

From the foregoing it will be obvious that the invention will automatically adjust itself to the movements of the casing and tube and will aid in absorbing the shocks to which these would otherwise be subjected. Not only this, but the follower is of such construction that it constitutes a protector for the tube in that it spaces the same away from the corrosive metal rim and also prevents puncturing of the side walls of the tube.

Having thus described the invention, what I claim is:—

In an automobile tire, a casing, an inner tube therein, a rim to which the casing is connected, a follower interposed between the tube and the rim, and including a transversely bowed central portion and arcuate side walls, the transversely bowed central portion engaging the tube and the arcuate side walls engaging the casing between the inner surface of the casing and the inner tube, and a plurality of springs mounted between the transversely bowed central portion of the follower and the rim.

In testimony whereof I affix my signature.

SOFRONIO A. NANTES.